（12）United States Patent
Miranda et al.

(10) Patent No.: US 8,560,482 B2
(45) Date of Patent: Oct. 15, 2013

(54) AVATAR-BASED TECHNICAL NETWORKING SYSTEM

(75) Inventors: Anthony John Miranda, Strongsville, OH (US); Jennifer Jones, North Ridgeville, OH (US); Rosella Miranda, Strongsville, OH (US); Giuseppe G. Miranda, Strongsville, OH (US)

(73) Assignee: Alphaport, Inc., Cleveland, OH (US)

( * ) Notice: Subject to any disclaimer, the term of this patent is extended or adjusted under 35 U.S.C. 154(b) by 261 days.

(21) Appl. No.: 12/961,618

(22) Filed: Dec. 7, 2010

(65) Prior Publication Data

US 2011/0137844 A1  Jun. 9, 2011

Related U.S. Application Data

(60) Provisional application No. 61/267,176, filed on Dec. 7, 2009.

(51) Int. Cl.
| | | |
|---|---|---|
| *G06F 17/00* | (2006.01) | |
| *G06F 7/00* | (2006.01) | |
| *G06N 5/02* | (2006.01) | |
| *G06F 17/30* | (2006.01) | |

(52) U.S. Cl.
CPC .......... *G06N 5/025* (2013.01); *G06F 17/30592* (2013.01)
USPC ............................................. 706/47; 707/600

(58) Field of Classification Search
USPC ........................................... 706/47; 707/600
See application file for complete search history.

(56) References Cited

U.S. PATENT DOCUMENTS

| | | | |
|---|---|---|---|
| 6,405,197 B2 | 6/2002 | Gilmour | |
| 6,421,066 B1 | 7/2002 | Sivan | |
| 6,421,669 B1 | 7/2002 | Gilmour et al. | |
| 6,970,879 B1 | 11/2005 | Gilmour | |
| 6,976,002 B1 | 12/2005 | Ferguson et al. | |
| 7,152,092 B2 * | 12/2006 | Beams et al. | 709/204 |
| 2003/0093322 A1 | 5/2003 | Sciuk | |
| 2003/0158747 A1 | 8/2003 | Beton et al. | |
| 2005/0010462 A1 | 1/2005 | Dausch et al. | |
| 2005/0091191 A1 | 4/2005 | Miller et al. | |
| 2005/0095569 A1 | 5/2005 | Franklin | |
| 2006/0129975 A1 | 6/2006 | Wille et al. | |
| 2007/0124188 A1 | 5/2007 | Herman et al. | |
| 2008/0077461 A1 | 3/2008 | Glick | |
| 2008/0077462 A1 | 3/2008 | Patel et al. | |
| 2008/0082568 A1 | 4/2008 | Miller et al. | |

(Continued)

*Primary Examiner* — Alan Chen
(74) *Attorney, Agent, or Firm* — Buckingham, Doolittle & Burroughs, LLP

(57) ABSTRACT

A virtual technical networking architecture is disclosed that allows a user to locate resources, seek expertise and collaborate with identified experts located within a virtual city in order to mentor, teach and resolve problems or fill a need. The virtual city offers a gaming technology environment to users, wherein the users and experts are depicted as avatars within the virtual city and different levels of expertise and different affiliations are identified by different avatar accessories. The virtual city connects users for learning and problem resolution and also recognizes the accomplishments of experts and memorializes these accomplishments in the virtual city. Accordingly, an entire city of experts in a wide variety of fields can be built, that brings large groups of people and resources together for intellectual capital and knowledge management. The virtual city can then be used to educate, train and disseminate information.

21 Claims, 11 Drawing Sheets

(56) References Cited

U.S. PATENT DOCUMENTS

| | | |
|---|---|---|
| 2008/0091692 A1 | 4/2008 | Keith et al. |
| 2008/0120558 A1 | 5/2008 | Nathan et al. |
| 2008/0204450 A1 | 8/2008 | Dawson et al. |
| 2008/0221892 A1 | 9/2008 | Nathan et al. |
| 2009/0063463 A1* | 3/2009 | Turner et al. ............ 707/5 |
| 2009/0063552 A1 | 3/2009 | Jones |
| 2009/0119604 A1* | 5/2009 | Simard et al. ............ 715/757 |
| 2011/0004481 A1* | 1/2011 | Jones ............ 705/1.1 |

* cited by examiner

AVATAR-BASED TECHNICAL NETWORKING SYSTEM

CROSS-REFERENCE

This application claims priority from Provisional Patent Application Ser. No. 61/267,176 filed Dec. 7, 2009.

BACKGROUND

Intellectual capital is largely held in an organization, business and/or university's past and present employees. As employees leave, it becomes more difficult to harness this intellectual capital. To maximize the value of this intellectual capital and the experience of skilled employees and other professionals, knowledge management processes are typically implemented. For example, these processes include conducting interviews or documenting everything the employee deemed to be important shortly before leaving the organization. However, these processes create a variety of problems and do not always succeed in capturing the intellectual capital. For example, what is important to one person is not necessarily important to others. Most knowledge cannot be documented but is inherently connected to people. Questions and documents are inadequate to capture informal conversations or to make social connections visible. Further, given the short time span allotted, it is very likely to miss important pieces of information when interviews are conducted.

Accordingly, relying only on formal approaches like the ones mentioned above will yield poor results when it comes to knowledge retention. An organization, business and/or university needs to take an approach that allows the timely capture/transfer of informal knowledge. Thus, instead of trying to document everything and controlling knowledge transfer, an organization should invest their efforts in facilitating knowledge networking. Allowing employees to connect and interact with each other and other professionals outside the organization, using a technical network of professionals from Government, Industry and Academia—crowd sourcing. By doing so knowledge of subject-matter experts is naturally disseminated across the organization.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A virtual technical networking architecture is disclosed that allows a user to locate resources, seek expertise and collaborate with identified experts located within a virtual city in order to mentor, teach and resolve problems or fill a need. The virtual city offers a gaming technology environment to users, wherein the experts are depicted as avatars within the virtual city and different levels of expertise and different affiliations or professions are identified by different avatar accessories. The virtual city allows for the knowledge management of a wide variety of sources categorized into common areas of interest. Thus, the virtual city connects people and transfers knowledge remotely in an on-demand environment. Accordingly, an entire virtual city of experts in a wide variety of fields can be built, that brings large groups of people and resources together for intellectual capital and knowledge management. The virtual city can then be used to educate, train and disseminate information, and can be specifically applied in an educational or career training environment.

The virtual city maintains an office at the center of the virtual city that provides the users and experts with options to function in the virtual city. Once a user enters the virtual city through the office, the user can enter any of the established expert buildings within the virtual city. The expert buildings are groups of experts from a particular taxonomy of disciplines or fields of interest. Experts can be placed within more than one expert building within the virtual city, depending on their background, taxonomy of disciplines and level of expertise. Users utilize the expert buildings to identify potential experts to mentor, teach and resolve their problems. Further, the virtual city offers a gaming technology environment to users, wherein the users and experts are depicted as avatars within the virtual city and different levels of expertise and different affiliations are identified by different avatar accessories.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
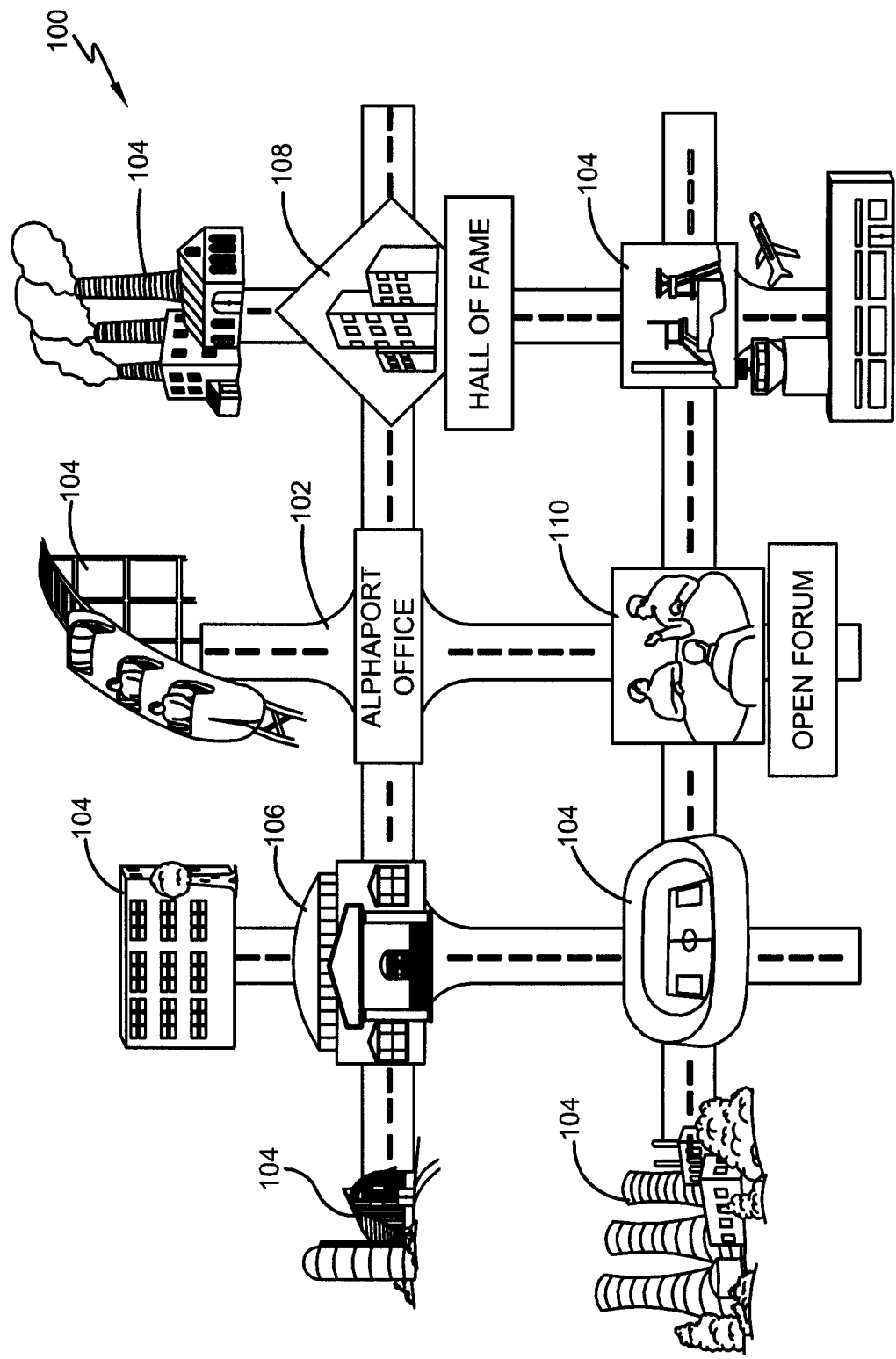
FIG. 1 illustrates a computer-implemented virtual technical networking city in accordance with the disclosed architecture.

To maximize the value of intellectual capital and the experience of skilled employees and other professionals, an organization, business and/or university needs to invest their efforts in facilitating knowledge networking. Specifically, the organization, business and/or university needs to allow employees to connect and interact with each other and other professionals outside the organization, using a technical network of professionals from Government, Industry and Academia. By doing so knowledge of subject-matter experts is naturally disseminated across the organization.

The disclosed architecture provides a virtual technical networking architecture that allows a user to locate resources, seek expertise and collaborate with identified experts located within a virtual city in order to mentor, teach and resolve problems or fill a need. The virtual city offers a gaming technology environment to users, wherein the users and experts are depicted as avatars within the virtual city and different levels of expertise and different affiliations are identified by different avatar accessories. Accordingly, an entire virtual city of experts in a wide variety of fields can be built, that brings large groups of people and resources together for intellectual capital and knowledge management.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented virtual technical networking city 100 in accordance with the disclosed architecture. The virtual city 100 allows a user to locate resources, seek expertise and collaborate with identified experts located within the virtual city 100 in order to mentor, teach and resolve problems or fill a need. The virtual city 100 offers a gaming technology environment to users. It connects users for learning and problem resolution and also recognizes the accomplishments of experts and memorializes these accomplishments in the virtual city 100. The virtual city 100 allows for the knowledge management of a wide variety of sources categorized into common areas of interest. Thus, the virtual city 100 connects people and transfers knowledge remotely in an on-demand environment. As the virtual city develops, there may be collaboration among industries that did not previously see the benefit to working together.

Accordingly, an entire virtual city of experts in a wide variety of fields can be built, that brings large groups of people and resources together for intellectual capital and knowledge management. The virtual city 100 can then be used to educate, train and disseminate information, and can be specifically applied in an educational or career training environment. Referring specifically to FIG. 1, the virtual city 100 maintains an office 102. The office or Alphaport Office 102 is at the center of the virtual city 100 and provides the users and experts with options to function in the virtual city 100. Experts and users entering the virtual city 100, must first begin at the Alphaport Office 102 before accessing the rest of the virtual city 100. Once a user or expert enters the virtual city 100 through the Alphaport Office 102, the user or expert can enter any of the established expert buildings 104 within the virtual city 100. When the expert is chosen, the user can get a choice of maps on how to walk to the building. A direct, shortest route will be one option. Based on the topic area the user has entered into the system, other maps will be provided as options to show the user other buildings of experts that may be associated by the taxonomy. By walking past other buildings, it may spark an idea of how other options are available.

In addition, newsstands (not shown) will be placed throughout the virtual city 100 where the user can stop and read the latest news and highlighted knowledge facts.

The expert buildings 104 are groups of experts from a particular taxonomy of disciplines or field of interest. The expert buildings 104 can be located anywhere within the virtual city 100, with the location being based on a first come, first serve arrangement. An expert building 104 can be founded by as few as one expert within a particular taxonomy of disciplines or field of interest, wherein the specific taxonomy of discipline or field of interest is not represented by a previously established expert building 104. This expert can then be listed as the founder of the expert building 104 and can then have the ability to position their expert building 104 in any available location within the virtual city 100, that is not taken by a previously formed expert building 104. In order to found an expert building 104 in the city, the expert must create various tests that comprise a series of questions that tests the knowledge of that particular discipline. These tests will be used to allow users to advance to different levels by passing the tests that the expert established. These tests will also be used to specify the discipline details covered by that expert and building.

Experts can be placed within more than one expert building 104 within the virtual city 100, depending on their background, taxonomy of disciplines and level of expertise. Furthermore, the experts are depicted as avatars within the virtual city 100 and different levels of expertise and different affiliations or professions are identified by different avatar accessories. For example, various levels of expertise can be identified by expert avatars wearing a jacket or hat of a specific color or both. An expert that has a military background could be identified by having a military uniform and/or chevrons. These accessories will be the result of accomplishments or awards that the expert has achieved within the virtual city. These expert accessories will have specific criteria associated with it. Criteria may be activities such as a certain number of artifacts added to the library, peer ratings on expert collaborations, or a specific number of group collaboration events.

Users utilize the expert buildings 104 to identify potential experts to mentor, teach and resolve their problems. Once an expert is identified, then a collaboration can occur. Each expert will have accepted forms of collaboration to choose from, and multiple forms of collaboration may be selected. The user selects a form of collaboration from the accepted formats and begins the collaboration. Experts and/or users can invite observers or other experts and/or users to observe or participate in the collaboration. If this occurs, then the expert and user can enter the open forum or Bite of Knowledge Restaurant 110 to host the collaboration. The Bite of Knowledge Restaurant 110 is an open forum for multiple users, experts and observers to participate in a collaboration. Phrases like a "Nickle for a Nugget" or a "Dime for Discussion" or simply your two cents will be used. Users can also participate in the tests associated with that specific discipline that were developed by the founding expert and fellow experts. By taking these tests, users can advance to different levels in the game without any type of fee associated, this adds to the gaming aspect and transferring knowledge aspect of the virtual city 100. There will also be gaming activities established for each expert building 104 that is created in the virtual city 100. Users can play these games to advance their knowledge in that discipline. Both experts and users can achieve various certifications, diplomas, or degrees to carry with their avatar or hang on their office wall. Users and experts in the game can also host celebrations in recognition of their accomplishments in the virtual city 100. Sponsors can be added to the virtual city 100 to reward levels, certifications, diplomas, degrees, or other accomplishments within the virtual city 100.

If a solution is achieved based on the collaboration, then it is determined whether a tangible artifact can be gleaned from the collaboration to enhance future requests. If there is a knowledge artifact created, then a standard set of information metrics is gathered and the artifact is added to the library 106. The library 106 is located within the virtual city 100 and houses all knowledge artifacts created based on a user/expert collaboration in un-editable format. All users and experts of the virtual city 100 have access to all knowledge artifacts and other resources contained within the library 106. If, for any reason, an expert decides to leave or is removed from the virtual city 100, all knowledge artifacts created during collaboration with a user within the virtual city 100 remain in the library 106.

Furthermore, once a solution has been achieved between a user and an expert, a standard set of metrics will be provided for the user to respond to. Besides creation of a knowledge artifact, this feedback will also be used to acknowledge the experts and determine their admission to the hall of fame 108. The hall of fame 108 recognizes the accomplishments of experts and memorializes these accomplishments. Experts that have been admitted into the hall of fame 108 maintain avatars that are depicted with a unique designation. For example, but not limited to, a coat or hat of a specific color, or both, etc. Throughout the virtual city, whether it's the result of a collaboration or the establishment of an expert building within the virtual city, there will be rewards for integration in school curricula through the academic partners associated with the virtual city.

Figure 2:
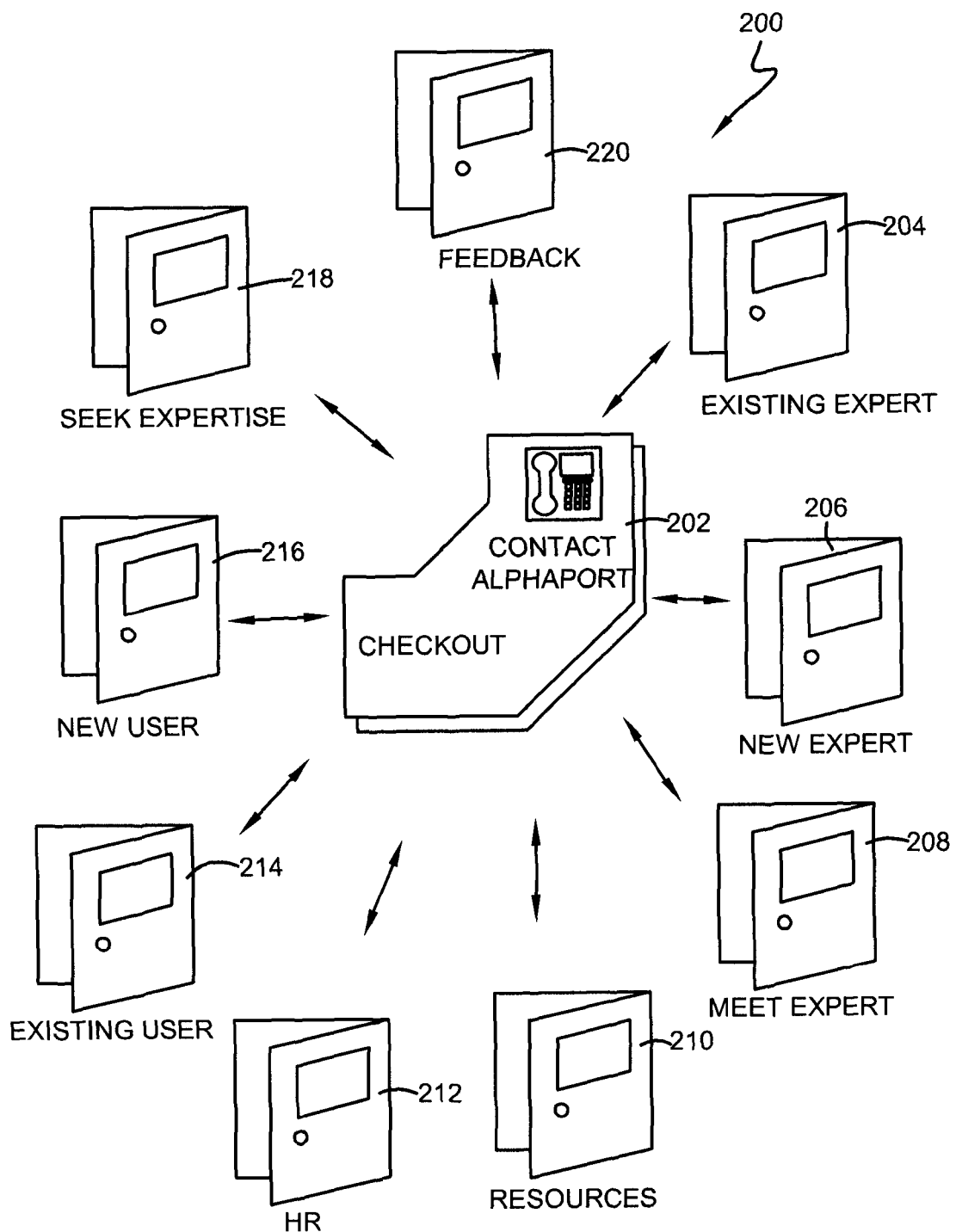
FIG. 2 an embodiment of the virtual city, wherein the office component is described in more detail.

FIG. 2 illustrates an embodiment of the virtual city, wherein the office component or Alphaport Office component 200 is described in more detail. The Alphaport Office component 200 is the center of the virtual city and provides the users and experts with options to function in the virtual city. For example, a checkout and customer contact 202 is provided which a user utilizes when paying fees. A membership fee may be assessed for frequent access to the virtual city, wherein different frequency and usage rates will be offered depending on a user's wants and needs. Further, a user may accumulate fees in collaborating with an expert(s) or a cost per document may be assessed per document the user wishes to download from the library of resources and knowledge artifacts.

For example, when a user selects an expert and enters into a collaboration with that expert, a fee must be paid before continuing with collaboration. Different forms of collaboration have different fees associated with them. If the user chooses to open their collaboration session up to other users, this would reduce the cost of the fee, as the other users participating would need to pay a portion of the fee to attend. Further, if a user decides to provide feedback on their expert and collaboration, the user will receive a percentage of their fee back. Also, if a knowledge artifact is created from the collaboration, then the user's fee will also be reduced for contributing to the knowledge artifact, which will them be stored in the library. A user can also receive feedback points that can be redeemed for knowledge and/or collaborations in future virtual city experiences.

Further, the checkout hub 202 also contains the customer support contact information for the system. A user of the virtual city can access the checkout hub/customer support contact component 202 if the user has any problems in accessing the expert buildings or entering the virtual city in general.

The checkout hub/customer support contact component 202 would have a list of all the contact numbers for support staff for the virtual city.

Expert resource links within the Alphaport Office 200 include an existing expert link 204 that allows a user access to a list of all existing experts within the virtual city. A new expert link 206 allows a new expert to complete a profile, complete a taxonomy of disciplines, select expert building location(s), select forms of collaboration, and complete the Non-Disclosure Agreement to become an expert within the virtual city. The meet experts link 208 allows a user to view a list of all the experts along with specific feedback about the expert's activities and previous collaboration in the virtual city.

Further links include the resources link 210 that provides access to the library of the virtual city. The library contains all knowledge artifacts and other resources created based on a user/expert collaboration in un-editable format. All users and experts of the virtual city have access to all knowledge artifacts and other resources contained within the library. The human resources link 212 allows experts to request their status and review any feedback received from previous collaborations and other information metrics.

User resource links within the Alphaport Office 200 include an existing user link 214 that provides a listing of all existing users within the virtual city. The new user link 216 allows a new user to create a profile and become a member of the virtual city. The seek expertise link 218 allows a user to type a search question and then review a proposed list of experts to provide a solution. Once an expert is selected, a form of collaboration is selected and the selected collaboration takes place. The feedback link 220 allows a user to review feedback options, select feedback options and provide information metrics. The user is able to review an expert, their resources, and the collaboration and provide feedback. The feedback link 220 can also be accessed by users wanting to review the feedback given to experts based on previous collaborations.

All of the links located within the Alphaport Office 200 provide users and experts with options to function in the virtual city. For example, a user will have the option within the Alphaport Office 200 to seek expertise, review experts, review resources and provide feedback. Experts will have the option within the Alphaport Office 200 to create a profile and become an expert, meet other experts, review resources, and review feedback.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
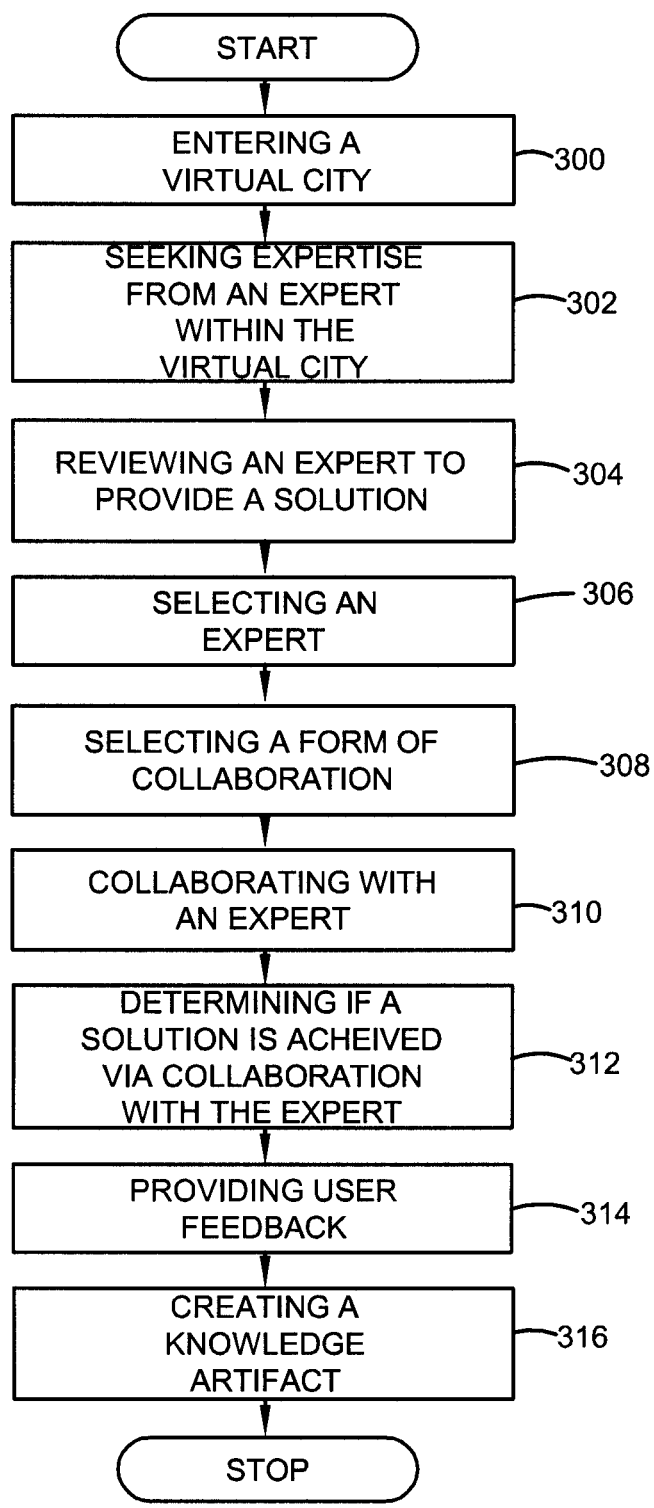
FIG. 3 illustrates a computer-implemented virtual technical networking method for a user.

FIG. 3 illustrates a computer-implemented virtual networking method for a user and further describes the technical networking system in operation. A user begins their journey for knowledge in the office or Alphaport Office, which is at the center of the virtual city and provides the user with options to function in the virtual city. Specifically, the user will have the option within the Alphaport Office to 1) seek expertise 2) review experts and 3) review resources and provide feedback. For example, the user may choose to seek expertise which will allow them to collaborate with an identified expert in order to solve a problem. Although the primary intent for collaborating with an expert is to help the user solve a problem, the user can also use this feature in order to collaborate on lessons learned and experiences the experts have encountered. There will be many forms of collaboration available and the user and expert will mutually agree on the preferred method of collaboration relevant to the identified topic. Forms of collaboration may include online discussions, phone contact, email contact, resource documents, and group discussions.

Further, a taxonomy of disciplines, organizations, fields, and such will be created to help the user select an expert pertaining to their topic. A user may choose to collaborate with one or more experts or the user may choose to browse the credentials of experts within the virtual city. This allows the user to see the quality of expertise within the virtual city for future potential use.

Specifically, at 300, a user enters the virtual city. Then, at 302, if a user has a problem to solve, a user will seek expertise from an expert within the virtual city. The user will have in mind a problem or topic they would like to discuss with an expert and will typically type in a search question. Specifically, the user will type a question in a search field and will be provided with search results for experts who may be able to support a solution. The user can also enter the taxonomy structure to refine their search to relevant nomenclature within the system and expertise. At 304, the user will review experts to provide a solution. The user will have a list of experts in the results of their search. Within the results of the list, the user can narrow down to the properties of each expert in order to receive more data on the expert and help them select which expert may best provide the information they need. The properties of each expert may include: name, contact information, industry/organization associations, academic accreditations, professional organizations, accepted forms of collaboration, feedback results, projects/programs, resources, etc.

At 306, a user selects an expert. Based on the properties of each expert, the user can select the appropriate expert to collaborate with. Multiple experts can be selected if a group discussion is desired. At 308, a user selects a form of collaboration. Each expert will have accepted forms of collaboration in their properties. The user must select a form of collaboration from the accepted formats in order to proceed. A fee must be paid before continuing with the collaboration. Different forms of collaboration may have different fees associated with them. Multiple forms of collaboration may also be selected. Some topics may require more than one session for collaboration and may require preparation activities. In this instance, an initial discussion can ensue and a schedule for collaboration can be agreed upon.

At 310, the user collaborates with the expert. Based on the agreed form of collaboration, the user and the expert exchange knowledge during the sessions. The user or expert can choose to terminate the collaboration if it is not progressing toward a solution. At this point, the user may choose to select another expert. If the collaboration will be online, the user may choose to open their session(s) to other users. This will reduce the cost of the collaboration fee but other users will need to pay a fee to attend. Open collaboration events will be posted in the Alphaport Office on the main page, in the virtual city. At 312, it is determine if a solution is achieved. Specifically, the user and the expert must determine separately if a solution has been achieved. This provides data in case the fee is disputed or the user and expert disagree on when a solution is achieved.

At 314, a user provides feedback. A standard set of metrics will be provided for the user to respond to. These metrics will be both quantitative and qualitative. Some metrics may include cost savings, time savings, product deliverables, timeliness, etc. If the user decides to provide feedback, they will receive a percentage of their fee back. This feedback will be used to acknowledge the experts and determine their admission into the hall of fame. After the session, at 316, a knowledge artifact is created. Once the user's request has been fulfilled, it needs to be determined if there is a tangible artifact that can be gleaned from the collaboration to enhance future requests. If there is a knowledge artifact, there will be a standard set of information gathered and the artifact will be added to the library. The user's fee will be reduced for contributing to the library.

Figure 4:
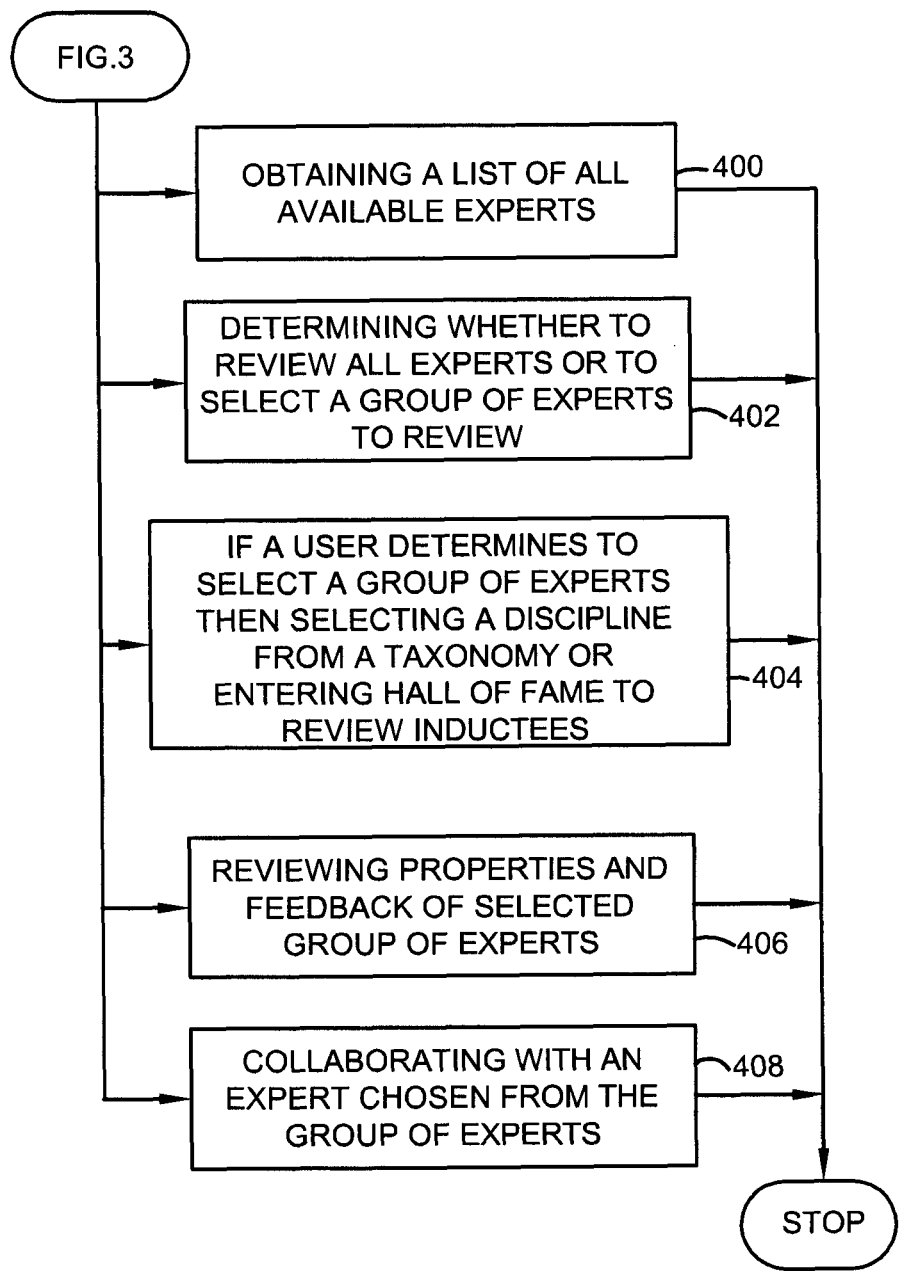
FIG. 4 illustrates another computer-implemented virtual technical networking method for a user.

FIG. 4 illustrates another computer-implemented virtual networking method for a user and further describes the technical networking system in operation. In this virtual networking method, a user has the option to review experts.

A user may choose to review the experts and their profiles prior to collaborating with them. This review can be done through the highly recognized hall of fame inductees or the full list of experts available in the virtual city. This can also be done by taxonomy where the experts are shown in relation to the area of expertise. At 400, a user may obtain a list of all available experts in the virtual city. At 402, a user can determine whether to review all experts or to select a specific grouping to review. The user will have a choice to look at all of the experts available in all areas of the taxonomy, even if the experts have no feedback ratings or prior activity in the virtual city. Or, the user can choose to identify a specific grouping of experts to review. At 404, if a user wants to select a specific grouping of experts to review, a user then selects a discipline from the taxonomy or enters the hall of fame to review the inductees. For example, the user can walk through the hall of fame and view all of the experts and their feedback. The hall of fame will be arranged in a structured format. Further, search criteria within the categorization of topics can be selected to narrow down the search results within the experts available. At 406, a user reviews properties and feedback of selected experts. Based on the search results, the user may select the expert properties to review the credentials and resources provided by the expert. Documents associated with the experts can be previewed, but must be viewed in the library. The user can also visit the "office" of the experts within the expert buildings, which has all of their resources they've contributed and the various awards they may have received. In addition to the properties of the experts, the user can review specific feedback about the expert's activities in the virtual city. At 408, a user can then collaborate with a chosen expert. Based on the properties and feedback reviewed in the hall of fame or in the expert profiles, the user can choose to collaborate with the selected experts and proceed with a collaboration as shown in FIG. 3. Users can also save selected experts in a user profile for future collaboration. This will expedite their collaboration in their next visit by skipping the search process and going directly to the associated experts.

Figure 5:
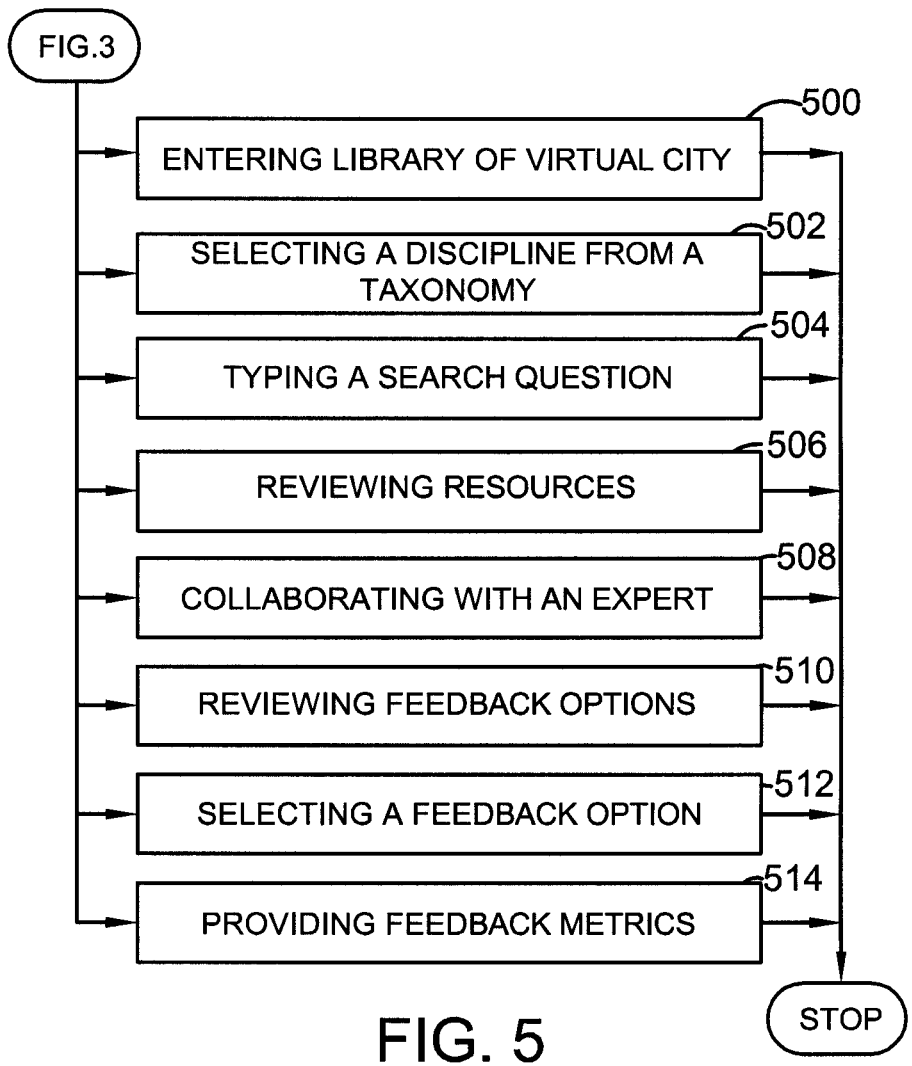
FIG. 5 illustrates another computer-implemented virtual technical networking method for a user.

FIG. 5 illustrates another computer-implemented virtual networking method for a user and further describes the technical networking system in operation. In this virtual networking method, a user has the option to review resources.

A user can evaluate the resources located in the library of the virtual city by selecting to review resources such as documents, videos, presentations, and other types of knowledge artifacts that have either been provided by experts or a result of activity completed in the virtual city. Most resources are located in the library within the virtual city, however resources can also be located in the expert buildings of the virtual city. At 500, a user enters the library of the virtual city. The user can then perform a search with the taxonomy structure to find associated resources that provide needed information. The user can then preview the properties of the documents. Based on the search results, users can download the documents. However, there will be a cost per document the user will pay in order to download the requested documents. All documents will be in an un-editable format. The user can also pay a membership fee for frequent access to the virtual city, wherein different frequency and usage rates will be offered. Users can also save the resources in their profile for future reference. This may help the user in collaboration with the experts.

At 502, a user then selects a discipline from the taxonomy. Resources will be categorized within the taxonomy of the virtual city. This format enables more efficient search results. At 504, a user then types search questions. Once disciplines are selected, specific search criteria can be added to refine the search. At 506, a user then reviews resources. User can review properties of the resources, including summary, contributor, type, disciplines, related resources, date created, source, industry association, etc. User can preview a brief portion of the document before deciding if it is appropriate for the knowledge needed by the user. At 508, a user then collaborates with an expert. After reviewing the resources, the user may choose to collaborate with the contributor or other experts as shown in FIG. 3.

If a user desires to comment on a collaboration, a user can provide feedback. After the user has had an experience with either an expert or a resource, the user is invited to provided feedback on the experience. This feedback will become available to other users for reference and will be used to meet metrics that allow the experts to be considered for the hall of fame or other recognitions within the virtual city. The user can receive a percentage of their fee back for providing feedback. The user can also receive feedback points that can be redeemed for knowledge in future virtual city experiences. At 510, a user reviews feedback options. The user will be provided with several options to provide feedback which may include cost savings, time savings, concise solution, value of experience, and others. At 512, a user then selects at least one feedback option. The user can choose to provide any or all of the options for feedback. At 514, a user then provides feedback metrics. The user can provide relevant information metrics on the feedback options selected.

Figure 6:
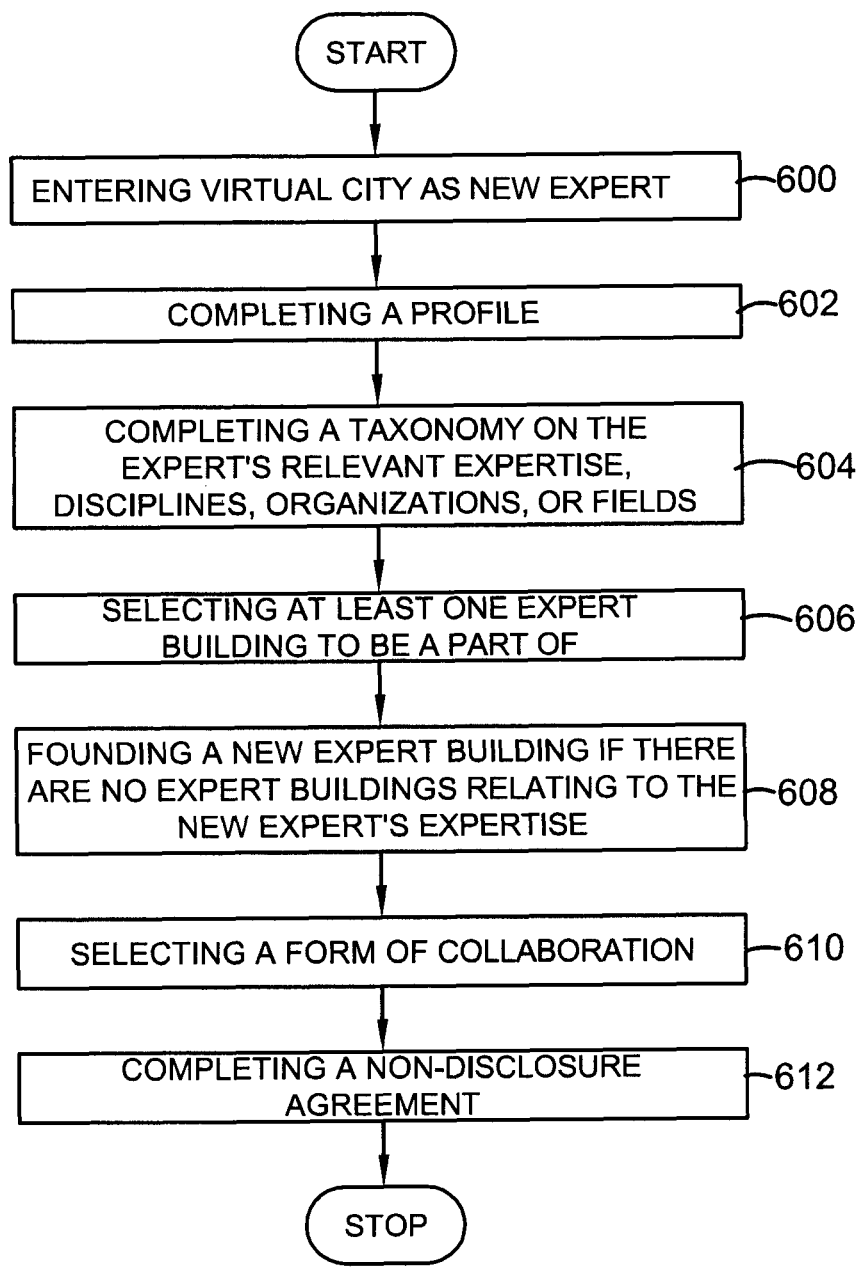
FIG. 6 illustrates a computer-implemented virtual technical networking method for an expert.

FIG. 6 illustrates a computer-implemented virtual networking method for an expert and further describes the technical networking system in operation. A new or existing expert begins their journey for knowledge in the office or Alphaport Office, which is at the center of the virtual city and provides the expert with options to function in the virtual city. Specifically, the expert will have the option within the Alphaport Office to 1) become an expert and meet other experts and 2) receive user requests and collaborations and request status.

Specifically, if a user wants to become an expert, at 600, an expert enters the virtual city as a new expert. At 602, the new expert completes a profile, which provides background information on the expert. At 604, the expert then completes a taxonomy on their relevant expertise, disciplines, organizations, fields, etc. At 606, an expert can then select an expert building to be a part of. At 608, an expert can found their own expert building if none relating to their expertise exists. Further, the experts are depicted as avatars within the virtual city and expert buildings. At 610, the expert then selects forms of available collaboration. There will be many forms of collaboration available and the user and expert will mutually agree on the preferred method of collaboration relevant to the identified topic. Forms of collaboration may include online discussions, phone contact, email contact, resource documents, and group discussions. At 612, the expert then completes a Non-Disclosure Agreement to complete their profile. The Non-Disclosure Agreement includes language that all knowledge artifacts created within the Technical Networking System or virtual city remain the property of the System and are maintained in the library of the virtual city.

Figure 7:
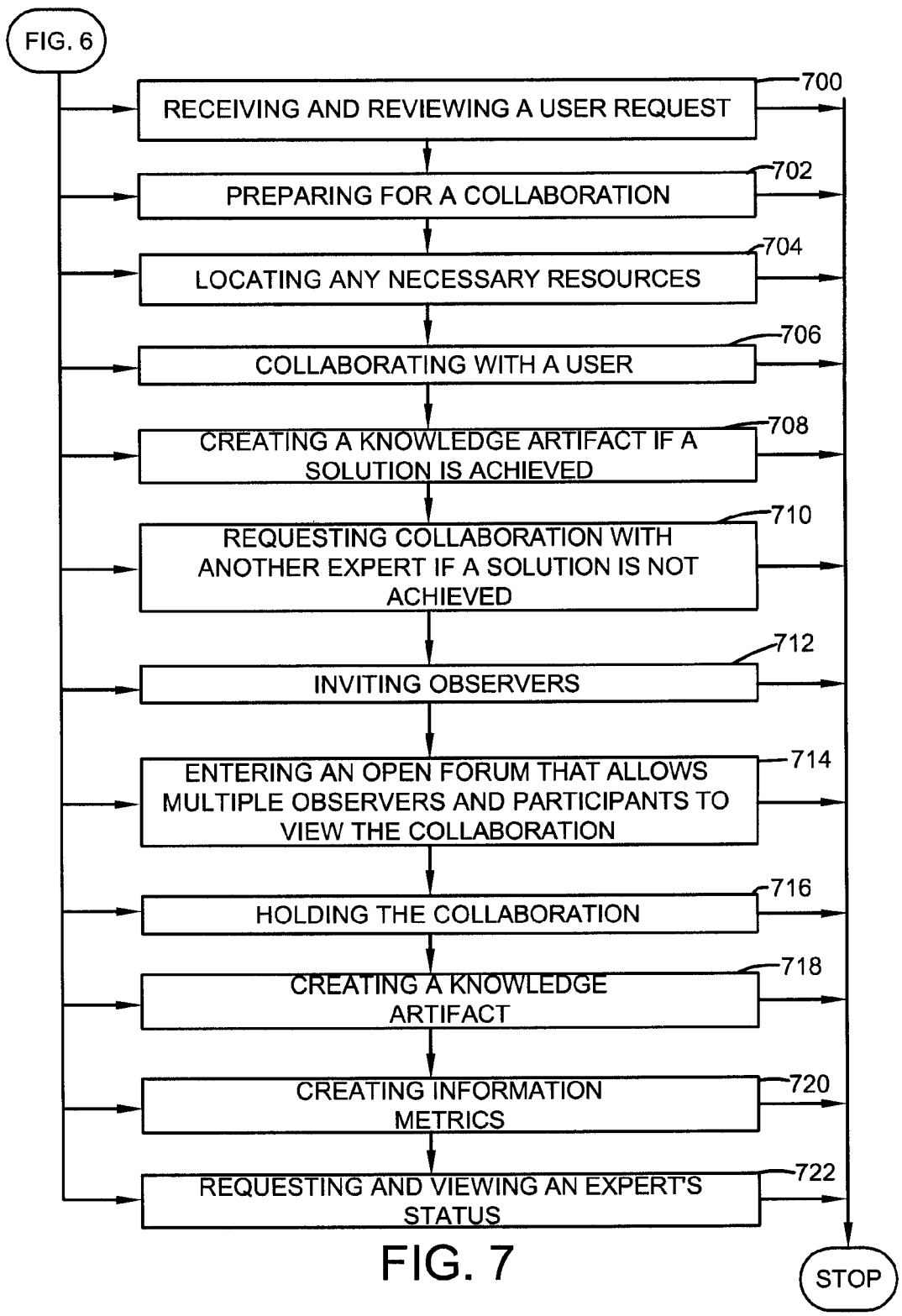
FIG. 7 illustrates another computer-implemented virtual technical networking method for an expert.

FIG. 7 illustrates another computer-implemented virtual networking method for an expert and further describes the technical networking system in operation. In this virtual networking method, an expert receives user requests and collaborations and request status.

At 700, a user request is made and received by an expert. The expert then reviews the request. At 702, the expert prepares for the collaboration. At 704, the expert locates any necessary resources. At 706, the expert then collaborates with the user. At 708, if a solution is achieved, then a knowledge artifact is created and stored in the library of the virtual city. If a solution is not achieved, then at 710, the expert can request expert collaboration with another expert. Further, at 712, an expert can also invite observers to the collaboration. If multiple participants or observers are involved in the collaboration, then, at 714, the user and expert can enter an open forum or "the Bite of Knowledge" restaurant. The "Bite of Knowledge" restaurant is an open forum that allows multiple observers and participants to view a collaboration. At 716, the collaboration is held and at 718, a knowledge artifact is created and stored in the library of the virtual city.

Finally, if feedback is provided, at 720, information metrics can be created for the expert, based on previous collaborations and other dealings with users. At 722, an expert can request and view their status and reviews and user feedback by entering the human resource site of the Alphaport Office in the virtual city. Different levels in status are identified by different avatar accessories. For example, various levels of expertise can be identified by expert avatars wearing a jacket or hat of a specific color or both.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
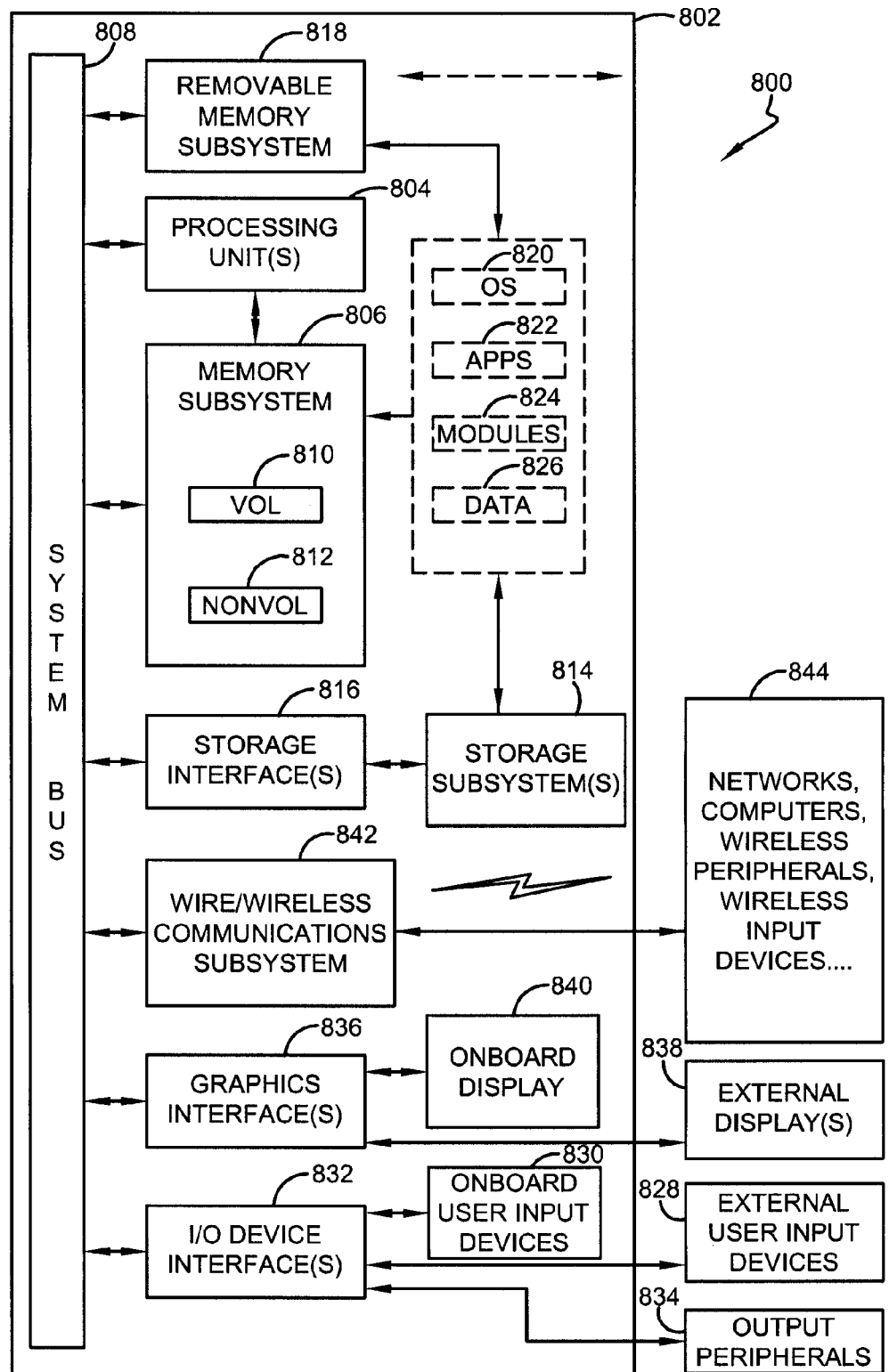
FIG. 8 illustrates a block diagram of a computing system operable to execute the virtual technical networking system in accordance with the disclosed architecture.

Referring now to FIG. 8, there is illustrated a block diagram of a computing system 800 operable to execute the virtual technical networking system in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1384, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1384 serial port, a game port, a USB port, an IR interface, etc. The I/O device interface(s) 832 also facilitate the use of output peripherals 834.

One or more graphics interface(s) 836 provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers.

Figure 9:
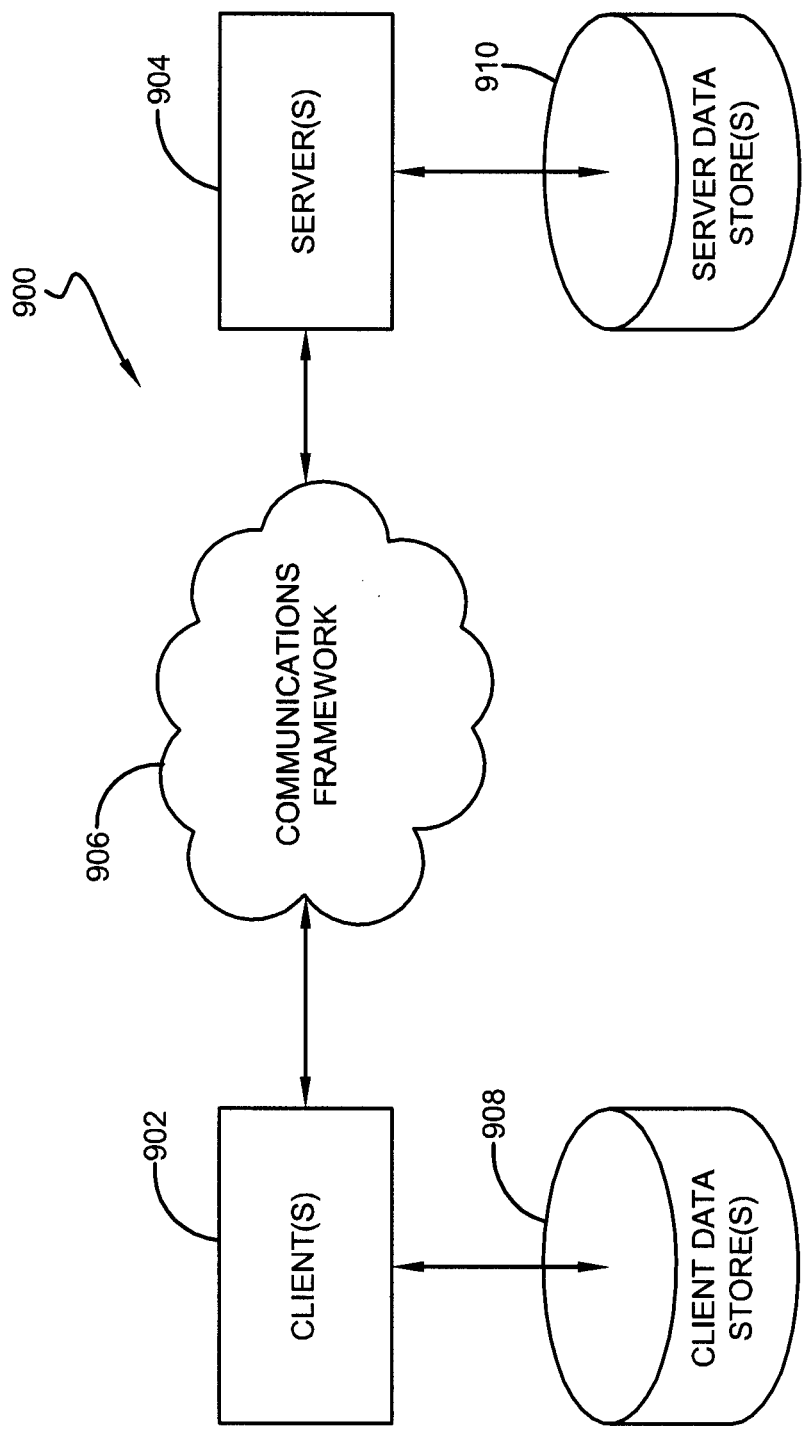
FIG. 9 illustrates an exemplary computing environment operable to provide support for the virtual technical networking system.

Referring now to FIG. 9, there is illustrated a schematic block diagram of a computing environment 900 operable to provide support for the virtual technical networking system. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Figure 10:
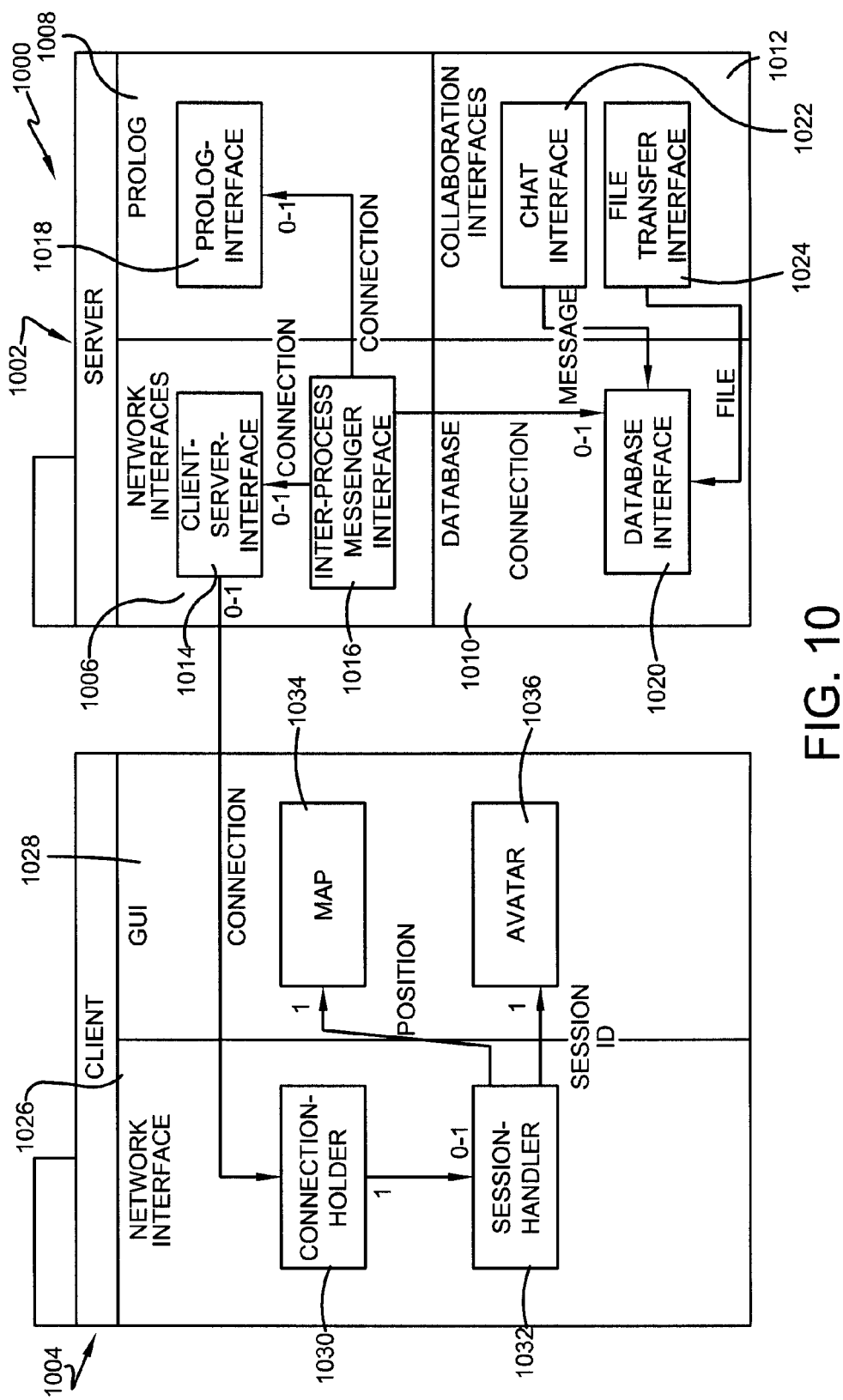
FIG. 10 illustrates an implementation of the disclosed architecture, showing how the different parts of the client-server application connect.

FIG. 10 illustrates an implementation of the disclosed architecture, showing how the different parts of the client-server application 1000 connect. The server 1002 can be broken up into four different components: the network hooks or interfaces 1006, the Prolog component 1008 (or artificial intelligence component), the database component 1010, and the collaboration components 1012.

The network hooks 1006 take care of all inter-process communication and all communication between the clients 1004 and the servers 1002 (to include server-to-server communication). The inter-process messenger interface (IMPI) 1016 passes data between the artificial intelligence component 1008 and the database component 1010, as well as passing results from queries to the clients 1004. For example, if a client 1004 were to attempt to retrieve a knowledge artifact from the server 1002, the client-server interface 1006 would receive the request from the client 1004 and pass it to the IPMI 1016. The IPMI 1016 would then query the database component 1010, which would pull from the file transfer interface 1024. The resulting artifact would then pass back through the IPMI 1016 to the client-server interface 1014 and then to the client 1004.

The Prolog component 1008 (which can actually be implemented using any artificial intelligence language) is used to provide advanced learning capabilities. The system utilizes knowledge gained by knowledge artifacts and communications between users to fill the artificial intelligence engine with a knowledge base. This component 1008 can then draw on the knowledge base to deduce new information, draw conclusions to questions, and answer relatively new questions (or questions posed in different ways) when an expert is unavailable or unable to answer the question through the Prolog-Interface 1018. Because the component 1008 is constantly fed new information and has access to all knowledge artifacts, it is capable of answering questions that have yet to be answered and draw connections that have gone unnoticed. This component 1008 essentially becomes the ultimate 'expert'—knowledgeable in all subjects—and can fill in for any expert who is not present. This component 1008 has full access to all files in the Avatar system, all collaboration transcripts, all data in the database component 1010, and can also link to other Prolog components and engines to create a larger and more intelligent artificial intelligence component. Additionally, this component 1008 can be called by multiple network interface components through the IPMI 1016, just as the database component 1010 can. This component 1008 may even be able to process closed captioning and voice to extract knowledge from audio and video files.

The database component 1010 is used to provide quick access to knowledge that has already been fed to it by users and experts. As questions and/or problems are solved, knowledge artifacts are created. These artifacts are then stored in the database component 1010, allowing quick searching and retrieval. In many cases, searches must be first strained by the artificial intelligence component 1008 to strip the search down to keywords or subjects that can then be looked up in the database component 1010 and scored using a 'relevance' score. This component 1010 consists of database engines and systems that specialize in rapid storage and retrieval and a database interface component 1020.

The collaboration interface 1012 comprises two main sections, the chat interface 1022 and the file transfer interface 1024. The chat interface 1022 provides a means for users and/or experts to communicate. All communications are stored in the database component 1010 and considered knowledge artifacts, making them searchable by the system. Additionally, this allows a store-and-forward architecture for all communications, which allows users to communicate in both near-real-time and in non-real-time. The file transfer interface 1024 facilitates the extraction of files from the system, such as images and PDFs, as well as searching through files.

This modular server 1002 design allows server components to be placed on different computers or processors, allowing a very distributed system. As the diagram illustrates, there can even be multiple IPMIs 1016 calling to a network of databases 1010 or artificial intelligence components 1008, linking them together in a novel and efficient manner. This allows the computational burden to be shared among near infinite processors and memories and removes the single point of failure common among most computer architectures.

The client 1004 is divided into two main sections, the network interface 1026 and the graphical user interface (GUI) 1028. The network interface 1026 is divided into a connection handler 1030, which handles the communication between the server 1002 and client 1004, and the session handler 1032, which handles session information concerning the connection to the server 1002. The graphical user interface 1028 is divided into the map 1034, which is what the users traverse, and the Avatar 1036, which draws avatars.

Figure 11:
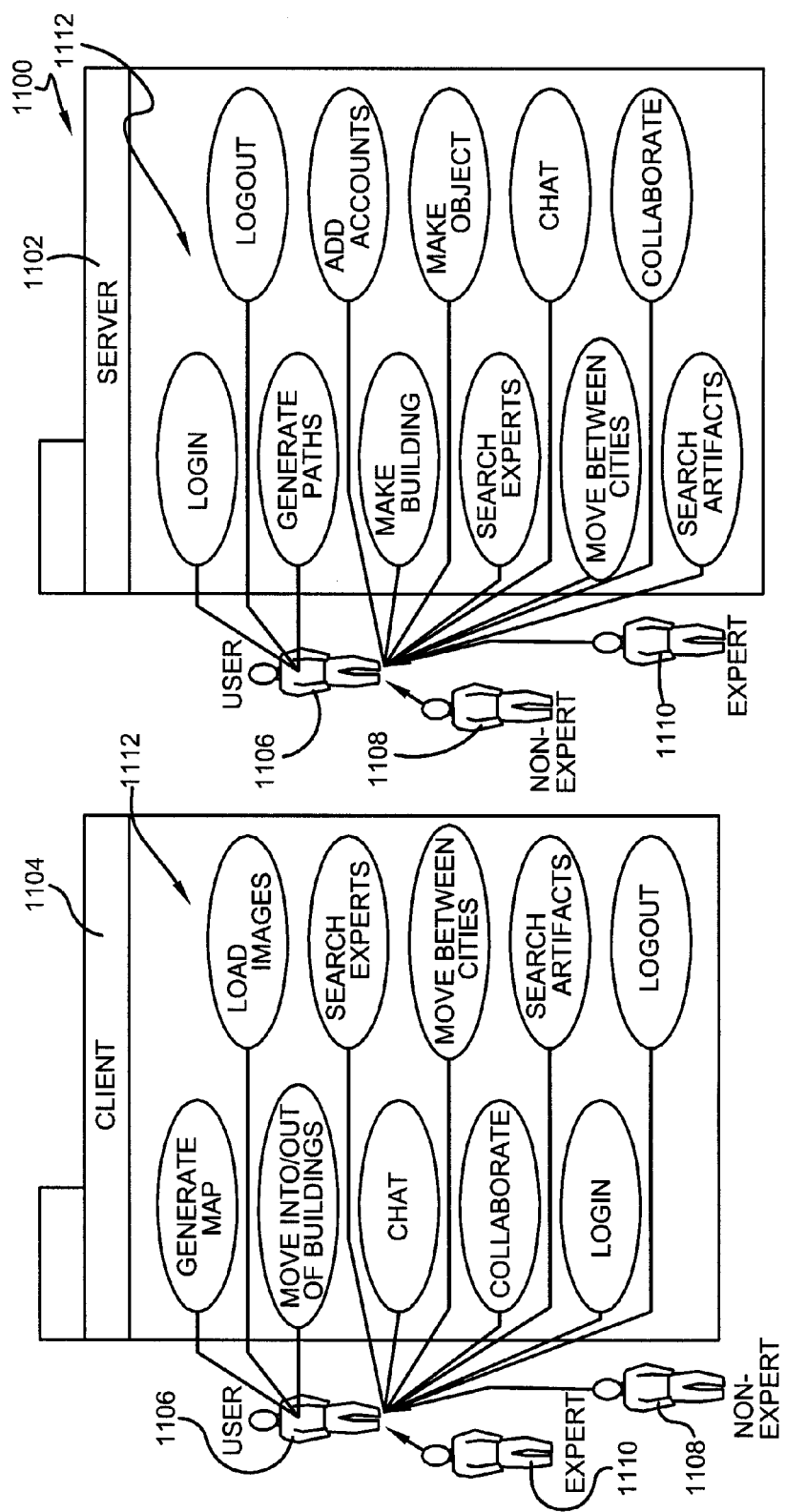
FIG. 11 illustrates a basic use case diagram of the disclosed architecture, showing the actors and how they interact with the system as well as the basic functionality.

FIG. 11 illustrates a basic use case diagram of the disclosed architecture, showing the actors and how they interact with the system 1100 as well as the basic functionality between the client 1104 and server 1002. The actors (users) 1106 are broken up into two different groups, the experts 1110 and the non-experts 1108. Experts 1110 are those individuals who are subject matter experts, specialists in the subject being discussed. Non-experts 1108 are those individual users participating in the discussion or communication, but who are not subject matter experts in the specific subject (although they may be 'experts' in different subjects). To non-experts 1108 who are looking at the registered experts 1110 of certain topics, experts 1110 remain in a single location, making them easy to find (they exist in the buildings of their taxonomy and can be in multiple buildings at once). Non-experts 1108, however, can move from city to city and between servers 1102.

Users 1106 can perform a variety of functions 1112 as shown in the client 1104 and server 1102. For example, users 1106 can search for experts 1110, initialize chats between non-experts 1108 and/or experts 1110, collaborate with non-experts 1108 and/or experts 1110, and search artifacts. Experts 1110 are also able to make buildings and objects, which are then stored in the database. If an object includes a file or files, those are stored on the file server mentioned in FIG. 10. The objects generated by experts 1110 are finalized knowledge artifacts; these are items that have been verified as accurate solutions to problems or questions. As such, the Avatar system is a crowd sourcing system of sorts, that also contains knowledge management aspects, collaboration aspects, and artificial intelligence to fill in any gaps.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented virtual technical networking system, comprising:
   a virtual city comprising an office and at least one expert building;
   at least one avatar representing a user of the networking system;
   at least one avatar representing an expert of the networking system;
   an open forum that can host a collaboration between the user and the expert, wherein multiple observers and participants can view the collaboration; and
   wherein the collaboration comprises problem-solving between the user and the expert and a knowledge artifact is created from the collaboration, wherein the knowledge artifact comprises documents, videos, or presentations; and
   a library that houses all knowledge artifacts created based on a user/expert collaboration in un-editable format.

2. The system of claim 1, wherein the office provides the at least one user and at least one expert with options to function in the virtual city.

3. The system of claim 2, wherein the at least one expert building comprises at least one expert from a particular taxonomy of disciplines.

4. The system of claim 3, wherein the at least one expert can be placed within more than one expert building within the virtual city, depending on the at least one expert's background, taxonomy of disciplines or level of expertise.

5. The system of claim 4, wherein the at least one avatar representing an expert of the networking system comprises different avatar accessories.

6. The system of claim 5, wherein the different avatar accessories represent different levels of expertise and different affiliations or professions.

7. The system of claim 5, wherein the different avatar accessories represent results of accomplishments or awards that the expert has achieved within the virtual city.

8. The system of claim 1, wherein the collaboration also comprises artificial intelligence to deduce facts or replace an absent expert.

9. The system of claim 8, wherein the system becomes more knowledgeable and intelligent as number of knowledge artifacts stored in the library increases.

10. The system of claim 9, wherein the system is capable of performing searches and queries against data of varying types and from various resources.

11. The system of claim 10, wherein the system is a computer-implemented, massively-distributed, virtual environment that is capable of:
    automatically recovering from network, processor, and memory failures;
    automatically distributing workload;
    automatically synchronizing with added components; and
    automatically utilizing failover.

12. The system of claim 1, further comprising a hall of fame that recognizes the accomplishments of the at least one expert and memorializes these accomplishments.

13. The system of claim 1, wherein the office comprises expert resource links that allows a user access to a list of existing experts and specific feedback about the expert's activities and previous collaboration, or allows a new expert to complete a profile and become an expert in the virtual city.

14. The system of claim 1, wherein the office comprises user resource links that allows a user access to a list of existing users within the virtual city, allows a new user to create a profile and become a member of the virtual city, allows a user to type a question and review a proposed list of experts to provide a solution, or allows a user to review feedback options and provide information metrics.

15. The system of claim 1, wherein the office comprises a resources link that provides access to a library of the virtual city.

16. The system of claim 1, wherein the office comprises a human resources link that allows the at least one expert to request status and review feedback received from previous collaborations and information metrics.

17. A computer-implemented virtual networking method for a user, using a processor coupled to a memory, comprising:
    entering a virtual city;
    seeking expertise from at least one expert within the virtual city;
    reviewing at least one expert to provide a solution;
    selecting at least one expert;
    selecting at least one form of collaboration;
    collaborating with the at least one expert;
    determining if a solution is achieved via collaboration with the at least one expert;
    providing user feedback; and
    creating at least one knowledge artifact, wherein the knowledge artifact comprises documents, videos, or presentations.

18. The method of claim 17, further comprising:
    obtaining a list of all available experts;
    determining whether to review all experts or to select at least one group of experts to review;
    if a user determines to select at least one group of experts to review, then selecting a discipline from at least one taxonomy or entering hall of fame to review inductees;
    reviewing properties and feedback of selected at least one group of experts; and
    collaborating with an expert chosen from the at least one group of experts.

19. The method of claim 18, further comprising:
    entering a library of the virtual city;
    selecting a discipline from at least one taxonomy;
    typing at least one search question;
    reviewing resources;
    collaborating with an expert;
    reviewing feedback options;
    selecting feedback options; and
    providing feedback metrics.

20. A computer-implemented virtual networking method for becoming an expert, using a processor coupled to a memory, comprising:
    entering a virtual city as a new expert;
    completing a profile;
    completing a taxonomy on the expert's relevant expertise, disciplines, organizations, or fields;
    selecting at least one expert building to be a part of;
    founding a new expert building if there are no expert buildings relating to the new expert's expertise;
    selecting at least one form of available collaboration; and
    completing a non-disclosure agreement to complete the profile.

21. The method of claim 20, further comprising:
    receiving and reviewing at least one user request;
    preparing for a collaboration;
    locating any necessary resources;
    collaborating with a user;
    creating a knowledge artifact if a solution is achieved, wherein the knowledge artifact comprises documents, videos, or presentations;

requesting expert collaboration with another expert if a solution is not achieved;
inviting observers;
entering an open forum that allows multiple observers and participants to view a collaboration;
holding the collaboration;
creating a knowledge artifact from the collaboration;
creating information metrics for an expert based on the collaboration; and
requesting and viewing an expert's status.

* * * * *